(12) United States Patent
Bernard et al.

(10) Patent No.: US 8,318,310 B2
(45) Date of Patent: Nov. 27, 2012

(54) POLYISOCYANATE COATING COMPOSITIONS CROSS-LINKABLE INTO ENHANCED ANTI-SHOCK COATINGS

(75) Inventors: Jean-Marie Bernard, Saint Laurent d'Agny (FR); Mathias Dubecq, Lyons (FR)

(73) Assignee: Perstorp France, Saint-Priest (FR)

( * ) Notice: Subject to any disclaimer, the term of this patent is extended or adjusted under 35 U.S.C. 154(b) by 988 days.

(21) Appl. No.: 12/294,093

(22) PCT Filed: Mar. 22, 2007

(86) PCT No.: PCT/FR2007/000484
§ 371 (c)(1),
(2), (4) Date: Sep. 23, 2008

(87) PCT Pub. No.: WO2007/122309
PCT Pub. Date: Nov. 1, 2007

(65) Prior Publication Data
US 2009/0104452 A1 Apr. 23, 2009

(30) Foreign Application Priority Data
Mar. 24, 2006 (FR) ...................... 06 02577

(51) Int. Cl.
*B32B 27/00* (2006.01)
(52) U.S. Cl. .............. 428/423.1; 427/385.5; 428/411.1; 428/413; 525/472; 526/310; 528/44; 528/45

(58) Field of Classification Search ............... 427/385.5; 428/411.1, 413, 423.1; 525/472; 526/310; 528/44, 45
See application file for complete search history.

(56) References Cited

U.S. PATENT DOCUMENTS

| 4,427,822 | A | * | 1/1984 | Nishizawa et al. | 524/726 |
|---|---|---|---|---|---|
| 5,877,254 | A | * | 3/1999 | La Casse et al. | 524/590 |
| 5,977,246 | A | * | 11/1999 | Fenn | 524/590 |
| 6,124,416 | A | | 9/2000 | Desbois et al. | |
| 6,217,941 | B1 | * | 4/2001 | Bernard et al. | 427/358 |
| 2003/0064227 | A1 | * | 4/2003 | Gam | 428/413 |
| 2003/0125449 | A1 | * | 7/2003 | Chen et al. | 524/501 |
| 2003/0185991 | A1 | * | 10/2003 | Wigger et al. | 427/386 |
| 2004/0106762 | A1 | * | 6/2004 | Charriere et al. | 528/44 |
| 2005/0020766 | A1 | * | 1/2005 | Rosen et al. | 524/589 |

FOREIGN PATENT DOCUMENTS

| EP | 1 106 636 A1 | 6/2001 |
|---|---|---|
| GB | 974900 | 11/1964 |
| WO | WO 94/13712 A1 | 6/1994 |

* cited by examiner

*Primary Examiner* — Lorna M Douyon
*Assistant Examiner* — Tri V Nguyen
(74) *Attorney, Agent, or Firm* — Buchanan Ingersoll & Rooney PC

(57) ABSTRACT

Polyisocyanate coating compositions, the polyisocyanates of which include dimer structural units (patterns) and imino-trimer structural units (patterns), are converted, via cross-linking, into useful such coatings as paints or varnishes having enhanced shock-resistant properties, notably chip-resistant properties for vehicle body parts.

14 Claims, No Drawings

US 8,318,310 B2

POLYISOCYANATE COATING COMPOSITIONS CROSS-LINKABLE INTO ENHANCED ANTI-SHOCK COATINGS

CROSS-REFERENCE TO PRIORITY/PCT APPLICATIONS

This application claims priority under 35 U.S.C. §119 of FR 0602577, filed Mar. 24, 2006, and is a continuation/national phase of PCT/FR 2007/000484, filed Mar. 22, 2007 and designating the United States (published in the French language on Nov. 1, 2007, as WO 2007/122309 A1; the title and abstract were also published in English), each hereby expressly incorporated by reference in its entirety and each assigned to the assignee hereof.

The present invention relates to the use of polyisocyanate compositions for producing coatings, in particular paints or varnishes for vehicle body parts.

The fields of application in which coatings are used are widely varied and increasingly require technologically advanced compositions having a high level of quality in relation to both the plane of application of the coating and to the characteristics of the finished product.

There is constant demand for coatings with improved properties, in particular an increased drying speed, greater resistance to impact and shock and improved behaviour with regard to chemical attack of any type, organic, microbial or atmospheric, as well as improved resistance to pressure washing, in particular for plastics material substrates.

In the automotive industry for example, there is a strong requirement for coating compositions having excellent shock-resistant properties, in particular resistance to chipping, in particular for coating compositions intended for original manufacturing equipment, that is to say as a primer coating for vehicle bodies, a base coating or even a top (or finishing) coat.

Blocked polyisocyanate-based monocomponent (1K) coating formulations, for example for OME (original manufacturing equipment) and for coil coating and can coating, are already known. The blocked polyisocyanates generally provide the substrates coated therewith very satisfactory physicochemical properties for compounders and for the most part satisfy the requirements in terms of appearance and performance, even if the application means are different in the fields in question.

Aqueous polyisocyanate-based coating formulations are also known. However, this type of aqueous formulation is not suitable for current coating technology, in particular coating technology used in the automotive industry.

The coatings obtained by using these known aqueous formulations generally have either satisfactory "hardness" characteristics, which are necessary for the use in question, or "resilient" characteristics, which are indispensable to ensure a good degree of resistance to chipping. The fact remains that there is still a lack of coating formulations which can combine both "hardness" and "resilience", in particular in the automotive and aeronautic industries in which effective, durable coatings, which are resistant to shock, chipping in particular, are required, in particular in relation to coatings comprising an aminoplastic resin.

Therefore, the first object of the present invention is to provide a coating composition having improved properties in terms of hardness and resilience in relation to coating compositions which are known in the field.

Another object of the present invention is to provide a coating composition having improved properties in terms of hardness and resilience as a coating for original manufacturing equipment.

Another object of the invention is to provide a non-aqueous coating composition having improved properties in terms of hardness and resilience as a coating for original manufacturing equipment.

Another object of the invention is to propose a non-aqueous coating composition having improved properties in terms of hardness and resilience as a coating for original manufacturing equipment which can be used in the automotive, aeronautic and rail industries.

Other objects will emerge from the following description of the invention.

The present invention thus firstly relates to the use of a composition comprising:

a) at least one polyisocyanate comprising at least one dimer pattern and at least one polyisocyanate which is the same as or different to the preceding polyisocyanate and comprises at least one imino-trimer pattern, b) at least one compound having at least one mobile hydrogen function selected from the primary and secondary hydroxyl functions, phenol functions, primary and/or secondary amine functions, carboxylic functions and the SH function, and c) at least one aminoplastic resin of the melamine-aldehyde type, in particular melamine-formaldehyde, and/or of the urea-aldehyde type, in particular urea-formaldehyde, or of the benzogiianamine type and/or the alkoxyalkyl derivatives thereof, for producing a coating by cross-linking by means of thermal treatment.

For the aforementioned use, the composition may also contain:

d) at least one catalyst for the reaction between compound a) and compound c), and/or at least one strong acid compound, or a latent form of said strong acid, for example a tertiary amine salt, as a catalyst for the reaction between melamine and/or urea compounds or derivatives thereof and true carbamate functions (—O—(C═O)—NH$_2$) and/or urethane functions (—O—(C═O)—NH—).

The term "strong acid" refers to an acid with a pKa in water of less than 4. Examples of strong acids of this type include para-toluene sulphonic acid, phosphoric acids and the monoesters or diesters thereof. These strong acids are generally known by the person skilled in the art as catalytic systems for cross-linking melamines.

The coating composition defined above optionally further comprises one or more pigments and/or additives which facilitate the use of the formulation or the production of coatings. Said additives are selected in particular from rheological additives, levelling additives, surfactant additives and other additives, and mixtures thereof.

The coating obtained by using the composition defined above has a good appearance and good mechanical properties, specifically improved resistance in terms of hardness, resistance to chipping and a good level of resistance to various chemical and/or biological attacks.

The present invention further allows a very good balance to be achieved between resilience and hardness, a balance which is particularly desired in the automotive or aeronautic industry.

These improved properties are obtained in particular when the composition is used as a hardener in the "primer" coat in a coating ("primer sealer"). The term "primer" coat is to be understood in the case of metal substrates, vehicle parts in particular, as the coat which is applied directly to the electrophoresis coat and is thermally cross-linked.

Cross-linking is generally achieved by thermally treating the coated substrate. Other forms of treatment are possible but thermal treatment is preferred. Thermal treatment is to be generally understood as the process in which the coated substrate passes through, or is placed in, a furnace at elevated temperature, that is to say greater than 60° C., in particular greater than 80° C., advantageously greater than 100° C., for a sufficient amount of time for the coating formulation to cross-link.

As mentioned above, heating may be achieved in different ways, such as heat guns, which enable only a portion of the substrate to be heated, or by using infrared radiation.

It is possible for the cross-linking temperature to be less than 60° C., the cross-linking time thus being longer. Conversely, if cross-linking is carried out at a temperature of approximately 300° C., it only requires a few dozen seconds, or even a few seconds; this is referred to as "flash" curing.

In a very particularly preferred embodiment, the polyisocyanate composition according to the present invention is generally cross-linked at a temperature of between 60° C. and 300° C., preferably greater than 80° C. and less than 300° C., advantageously between 100° C. and 200° C. for a period of time of between a few seconds and a few hours.

In general, a coat, known as a base coat, is then generally applied over the "primer" coat using the "wet-on-wet" method, then a final varnish coat, known as a "clear coat", is applied.

It is to be understood that the term "coating" used in the present document includes one or more of the different coats mentioned above, generally at least three coats, at least one coat of which, preferably the primer coat, is a composition according to the invention. However, the present invention is not limited to the use of the coating formulation for producing a primer coat.

It follows that the properties obtained relate to the entire coating composed of the different coats. In particular, the properties relating to resistance to chipping are measured over the total coating, whether it be composed of a single coat or a plurality of coats.

The use, to which the present invention relates, inter alia, is particularly suitable for the field of industrial polyurethane-based original manufacturing equipment (OME) paints, for which the coatings obtained exhibit, inter alia, improved hardness and resistance to chipping.

It was surprisingly found that some of the compositions proposed by the invention allow said property of resistance to chipping to be retained, and even improved, when retouching blemishes in the coating.

This retouching operation is characterised by a second application of the base coat and the varnish on the defective coating, followed by cross-linking by means of curing in a furnace. The retouching operation generally causes the anti-chip property in the final coating to deteriorate. This problem in particular can be overcome with the compositions used in the present invention.

Retaining this chip-resistant property during retouching is particularly sought after by vehicle paint manufacturers.

Increased resistance to chipping or, more simply, the "anti-chip" properties, are to be understood as the property of coatings to resist multiple impacts caused by hard objects, in particular small objects which are more or less spherical, striking the surface of the coated substrate at a high frequency at more or less high speeds at different angles to said surface, thus reproducing the conditions in which the gravel of a road surface impacts the body of a vehicle.

The compositions used as coatings in the sense of the present invention further allow resistance in particular to different attacks of chemical origin, solvents for example, and/or of biological origin such as animal droppings, bird droppings in particular.

Examples of desired properties for coatings, in particular paint coatings, specifically for body parts, particularly vehicle body parts, include a high level of hardness, a good level of adhesion to the substrate, a high level of resistance to chemical attack, a good level of resistance to UV radiation, high gloss, good colour retention, a high level of resistance to shock and good adhesive properties, in particular to plastics material substrates.

Good "anti-chip" properties are particularly desired for substrates subjected to repeated shock, in particular vehicle body parts, and in particular the parts located on the front face of the vehicle.

It has now surprisingly been found that varying the polyisocyanates, the components which react with the polyisocyanates by cross-linking, typically a polyol, or other components which are present in the paint formulation allows these properties to be very significantly improved.

In the scope of the present invention, the use of the composition according to the invention allows a coating to be prepared in the form of a monocomponent formulation (1K), or a bicomponent formulation (2K) or a multicomponent formulation. Each of these formulations may be in a non-aqueous form, a solvated formulation (with a solvent) or a hydro-organic formulation (water+solvent).

According to an advantageous embodiment of the present invention, when the formulation used is in the form of a monocomponent (1K) formulation, the polyisocyanate(s) of the composition is (are) masked in part, or is (are) even completely masked. In bicomponent or multicomponent formulations, the polyisocyanate(s) may also be masked in part or even masked completely, although this is not a preferred feature of the present invention.

It has also been found that adding (a) surfactant compound(s) to this coating formulation enables the shock-resistant properties to be improved further and the balance between hardness and resilience, and in particular resistance to chipping, to be optimised.

Most frequently, the coatings which are obtained from compositions containing known masked polyisocyanate hardeners and which are subjected to retouching become a great deal more brittle which leads to a significant decrease in the anti-chip property and a reduction in the hardness-resilience balance. This effect is all the more marked in coating formulations, particularly 1K formulations containing aminoplastic resins, (of the melamine-formaldehyde, urea-formaldehyde or benzoguanamine-formaldehyde type), which increase the hard or brittle nature of the coatings, especially after said retouching operations.

It has surprisingly been found that polyisocyanate compositions, in particular those based on hexamethylene diisocyanate (HDI), having masked isocyanate functions and containing at least one polyisocyanate with a high uretidinedione pattern content, also known as a true dimer, are particularly beneficial as coating hardeners for original manufacturing equipment (OME), in particular when they are in the form of 1K formulations.

Very advantageous results were also obtained by using compositions in which the polyisocyanate(s) has (have) a high uretidinedione pattern content and comprises (comprise) imino-trimer patterns.

In fact, compositions of this type improve the hardness, chemical-resistant and shock-resistant properties, particularly resistance to chipping, in a completely unexpected manner, even for paint compositions containing aminoplastic resins, in particular 1K paint compositions containing aminoplastic resins.

According to another aspect, the present invention also relates to a composition comprising:
a) at least one polyisocyanate comprising at least one dimer pattern and at least one polyisocyanate which is the same as or different to the preceding polyisocyanate and comprises at least one imino-trimer pattern,
b) at least one compound having at least one mobile hydrogen function selected from the primary or secondary hydroxyl functions, phenol functions, primary and/or secondary amine functions, carboxylic functions and the SH function, and
c) at least one aminoplastic resin of the melamine-aldehyde type, in particular melamine-formaldehyde, and/or of the urea-aldehyde type, in particular urea-formaldehyde, or of the benzoguanamine type and/or the alkoxyalkyl derivatives thereof.

Furthermore, the composition according to the present invention may also contain:
d) at least one catalyst for the reaction between compound a) and compound c), and/or at least one strong acid compound, or a latent form of said strong acid, for example a tertiary amine salt, as a catalyst for the reaction between the melamine and/or urea compounds or derivatives thereof and the true carbamate functions (—O—(C=O)—NH$_2$) and/or the urethane functions (—O—(C=O)—NH—).

The composition further optionally comprises one or more pigments and/or additives which facilitate the use of the formulation or the production of coatings, selected in particular from rheological additives, levelling additives, surfactant additives and other additives, and mixtures thereof.

Said composition is capable of being cross-linked by means of thermal treatment, for example cured in a furnace at an elevated temperature, preferably greater than 100° C. and less than 300° C. for a sufficient amount of time (from a few seconds to a few hours as a function of the temperature set) to obtain, after operations known as retouching operations, a coating with a good appearance and good mechanical properties and, most particularly, improved resistance in terms of hardness, good resistance to chemicals and which retains, in particular, the chip-resistant property.

According to a preferred embodiment of the present invention, the composition described above generally comprises:
from 5% to 20% by weight of at least one polyisocyanate in relation to the total weight of the composition without solvent (% of dry weight);
from 15% to 25% by weight of at least one aminoplastic resin in relation to the total weight of the composition without solvent (% of dry weight);
from 55% to 80% by weight of at least one compound having at least one mobile hydrogen function selected from the primary or secondary hydroxyl functions, phenol functions, primary and/or secondary amine functions, carboxylic functions and an SH function, in relation to the total weight of the composition without solvent (% of dry weight); and
from 35% to 55%, advantageously approximately 45% by weight, of at least one organic solvent in relation to the total weight of the composition.

The amount of reaction catalyst(s) present in the composition of the present invention is generally between 0% and 0.5% by weight in relation to the total weight of the composition without solvent (% of dry weight).

The polyisocyanate(s) defined in a) above has (have), before optionally being masked, an average functionality of isocyanate functions of at least 2 and at the most 10, preferably greater than 2.5 and at the most 8, advantageously between 2.8 and 6.5.

In the present description, functionality is expressed in terms of mass, as is customary in this field, i.e. the function of each element is weighted to the percentage by weight thereof.

In the conventional methods in the field, the different components of the oligomeric fractions are identified by infrared structural analysis, the distribution and functionalities of said fractions are given and quantified by using the characteristic bands of the polyisocyanate compounds, that is to say the isocyanate function band, the alkyl band, the CO bands of isocyanurate and imino-trimers, and those of uretidinedione. In this way the distribution of oligomers by weight for each synthesis example is obtained. A similar analysis may also be carried out by using Nuclear Magnetic Resonance (NMR).

A measured level of functionality (measured by means of the NCO function content), which may be compared to theoretical functionality in the case of pure oligomers, corresponds to each oligomer and to each oligomeric fraction (the HDI dimer therefore has a functionality of 2).

For the record, in this technical field, functionality is obtained by multiplying the percentage by weight of each oligomer in the composition by its own functionality, then the functionalities for each oligomer are added together. The total represents the average functionality of the oligomeric composition. In the case of the present invention, the final compositions are subjected to a separation process on a set of PLgel MIXED-E gel permeation columns sold by Polymer Laboratories.

In addition, it should also be noted that the average functionality of isocyanate functions f(iNCO) is defined by the following formula:

$$f(iNCO) = \frac{Mn \times [iNCO]}{42 \times 100}$$

in which: Mn represents the average molecular mass as a number obtained by gel permeation and
[iNCO] represents the isocyanate function concentration in grams per 100 grams.

The NCO titre is measured in a conventional manner in accordance with the AFNOR NF T 52-132 standard of September 1988 (occasionally referred to as the "dibutylamine method").

The composition according to the present invention preferably comprises:
at least one polyisocyanate with an elevated content of uretidinedione dimer patterns, which are advantageously bound to one or more isocyanurate patterns, said dimer patterns being bound to isocyanurate patterns by hydrocarbon chains, preferably alkyl chains;
at least one polyisocyanate which is the same as or different to the preceding polyisocyanate and contains at least one imino-trimer pattern;
optionally at least one polyisocyanate which is the same as or different to the preceding polyisocyanates and contains a true dimer;
at least one compound having at least one mobile hydrogen function, such as hydroxyl functions, and/or primary and/or secondary amine functions, and/or SH functions;
at least one organic solvent;

at least one aminoplastic resin of the melamine/formaldehyde and/or urea/formaldehyde or benzoguanamine types and/or the alkoxyalkyl derivatives thereof; and optionally at least one catalyst for the polyurethane reaction and/or at least one strong acid catalyst for the reaction between the melamine and/or urea compounds or the derivatives thereof and urethane functions or true carbamate functions.

The term "dimer pattern" is to be understood as the uretidinedione pattern with the empirical formula $C_2N_2O_2$ (molar mass=84) and the structural formula of which may be represented as follows:

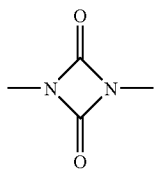

The term "true dimer" is to be understood as the product of the cyclodimerisation of two isocyanate monomer molecules which are the same or different and each comprise from 2 to 5 isocyanate functions, said cyclodimerisation reaction being able to be represented as follows:

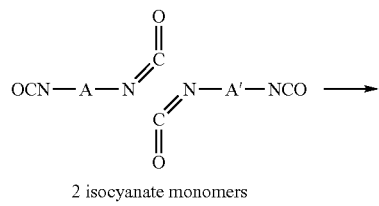

2 isocyanate monomers

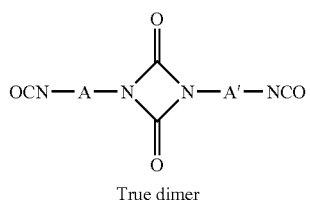

True dimer

In the diagram A and A' are the same or different and each represent a linear, branched or cyclic divalent radical containing from 1 to 20 carbon atoms, preferably 2 to 12 carbon atoms, advantageously from 2 to 8 carbon atoms, for example 6 carbon atoms, and optionally further comprise one, two or three isocyanate functions.

In the isocyanate composition according to the invention, the dimer patterns are advantageously bound to one or more isocyanurate patterns, in particular in the form of links represented by the following formulae (I) to (V), and mixtures thereof:

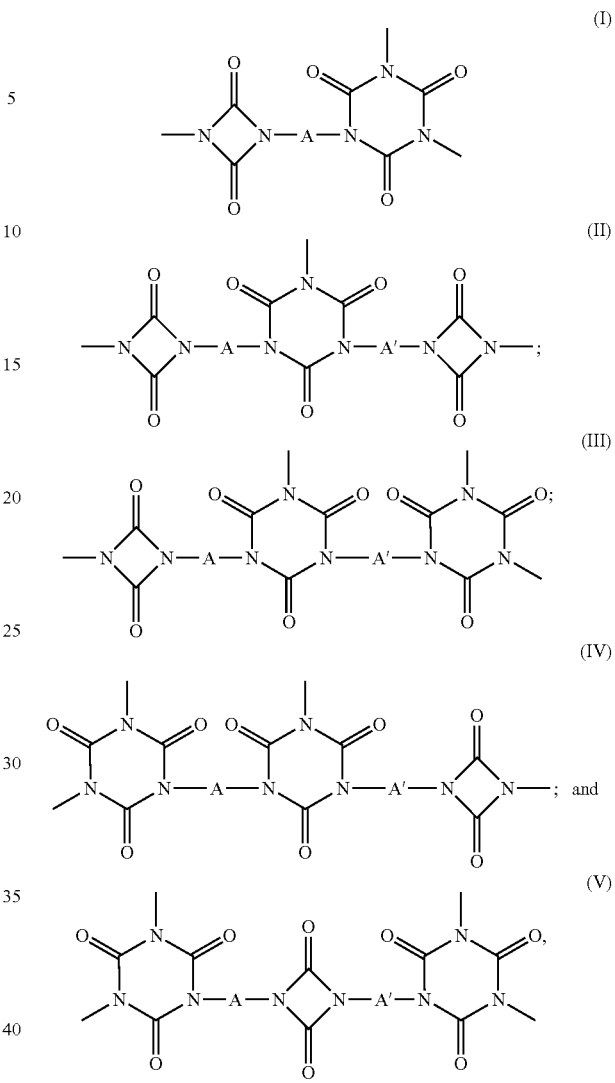

in which A and A' are the same or different and represent the residues of a monomer isocyanate compound after two isocyanate functions have been removed, and A and A' preferably each represent a linear, branched or cyclic divalent radical containing from 1 to 20 carbon atoms, preferably 2 to 12 carbon atoms, advantageously from 2 to 8 carbon atoms, for example 6 carbon atoms, and optionally further comprise 1, 2 or 3 isocyanate functions.

These link arrangements are given by way of illustrative example. Other link arrangements of uretidinedione pattern(s) and isocyanurate pattern(s) which are not shown in this document are also included in the scope of the present invention.

Amongst the polyisocyanate compositions according to the invention, those containing dimer patterns bound to isocyanurate patterns by hydrocarbon chains, preferably alkyl chains, preferably comprising the "isocyanurate-dimer pattern-isocyanurate" link arrangement (formula (V) above) have been found to be particularly beneficial for the retouching operations defined above, and also for improving the pumicing or laying of the coatings.

The dimer patterns may also be bound to one or more imino-trimer patterns in accordance with one or more of the link arrangements (I) to (V) defined above, in which one or more of the isocyanurate patterns is replaced by imino-trimer patterns.

The polyisocyanate composition defined above under a), of which the isocyanate functions are masked completely or in part in accordance with a preferred embodiment of the present invention, has an elevated dimer pattern content. The term "elevated dimer pattern content" is to be understood as an amount by weight of dimer patterns of between 0.25% and 25%, preferably between 0.5% and 20% in relation to the total weight of the polyisocyanate(s).

Furthermore, as mentioned above, the polyisocyanate(s) used in the composition of the present invention contains (contain) at least one imino-trimer pattern. In the meaning of the present invention, an imino-trimer pattern corresponds to the iminotriazinedione pattern with the empirical formula $C_3N_4O_2$ (molar mass=124) and the structural formula of which can be represented as follows:

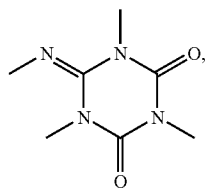

the nitrogen atoms being bound to the residues of chains originating from the starting diisocyanate monomers.

For hexamethylene diisocynate (HDI) monomers, an example of a cyclotrimer with an imino-trimer pattern may be represented by the following formula:

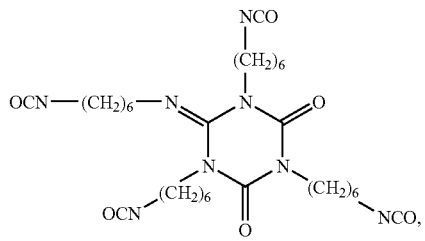

the isocyanate functions (NCO) at the ends of the chains being capable of being incorporated in the dimer or trimer cycles in the case of heavier oligomers.

In a very preferred manner, the compositions of the present invention have been found to be very beneficial for the uses described above when the polyisocyanate(s) in said compositions has (have) one of the two, preferably both, of the following characteristics:
  the molar ratio (isocyanate functions/imino-trimer patterns) is less than 100, preferably less than 90, before masking; and/or
  the molar ratio (imino-trimer patterns/trimer patterns) is greater than 3.

The iscocyanate functions which are present in the composition according to the invention are preferably masked at least in part, or are even completely masked. When said isocyanate functions are masked at least in part or are completely masked, the ratios given above remain unchanged. In particular, masking the isocyanate functions with masking agents does not affect the (imino-trimer patterns/trimer patterns) ratio in the slightest.

The two characteristics defined above may thus be expressed as:
  the molar ratio [(masked isocyanate functions+free isocyanate functions)/imino-trimer patterns] is less than 100, preferably less than 90; and/or
  the molar ratio (imino-trimer patterns/trimer patterns) is greater than 3.

As mentioned above, the composition according to the invention may further comprise pigments and additives which facilitate the use of the formulation or the production of coatings, i.e. rheological additives, levelling additives, etc.

Even though this variant is not preferred, the composition of the present invention may further comprise a surfactant, i.e. a compound which has the property of allowing hydrophobic and hydrophilic compounds to be mixed together, but this meaning does not include a compound which is capable of forming a suspension or an emulsion.

It should be noted in this context that the coating composition according to the invention, when in the 1K (monocomponent) form, is a solution, in contrast to an emulsion, dispersion, latex or another form, and is specifically a homogenous mixture of at least the compounds defined above under a), b) and c), and optionally including d). This means that there is a very low water content in the composition of the present invention, specifically a (water)/[(poly)isocyanates+surfactant] weight ratio of between 0 and 10%, preferably between 0 and 5%, advantageously between 0 and 1%.

The composition may also comprise a surfactant or a mixture of surfactants in an amount of generally between 0% and 30% by weight, preferably between 1% and 20% by weight, more preferably between 2% and 15% by weight.

When the composition of the invention comprises a surfactant or a mixture of surfactants, it is particularly advantageous to use an anionic surfactant or a non-ionic surfactant which optionally comprises a polyethylene glycol and/or propylene glycol chain fragment having at least one, advantageously at least five, preferably at least seven ethylene oxyl and/or propylene oxyl units.

The surfactant is advantageously selected in such a way that it does not comprise any functions, or comprises only a small amount of functions, which are reactive in relation to the polyisocyanate(s). In other words, the surfactant is present in the solvated composition in a substantially free form (in contrast to a form in which it is bound by a chemical bond to the polyisocyanate(s).

The term "substantially free form" is to be understood to mean that less than 50%, advantageously less than 20%, preferably less than 10% by weight of the surfactant is in a bound form.

However, the compositions in the form of a solution in which the surfactant is completely bound in a covalent manner to the (poly)isocyanates are also included in the scope of the present invention, although they do not represent a preferred embodiment.

In a preferred embodiment, the surfactant is an anionic agent with at least one function selected from aryl and/or alkyl sulphates or phosphates, aryl or alkyl phosphonates, phosphinates and sulphonates. It is of course to be understood that the composition of the present invention which is in the form of a solution may comprise a mixture of at least two surfactants.

The polyisocyanate(s) contained in the composition according to the present invention consists (consist) completely of an isocyanate and/or a polyisocyanate, either alone or mixed with one or more other isocyanates and/or polyisocyanates.

The polyisocyanates which are preferably used in the composition of the present invention and the isocyanate functions of which are advantageously blocked at least in part or are completely by masking agents are selected from the homo-condensation or heterocondensation products of alkylene diisocyanate, in particular those described in patent applications FR 2 822 828 and FR 2 837 820.

These polyisocyanates may optionally comprise one or more "biuret"-type and/or "trimer"-type functions, including, by way of non-limiting example, any functions of the following types: urea, urethane, allophanate, ester, amide, acylurea, isocyanurate, oxadiazinetrione, imino-dimer, imino-trimer (imino-triazadione), imino-oxadiazinedione (also known as an asymmetrical trimer) and diazetidinedione (also known as a dimer), and mixtures thereof.

The polyisocyanate(s) advantageously containing isocyanate functions which are masked completely or in part may also comprise true carbamate functions (R—O—C(=O)—$NH_2$) or epoxy functions or preferably cyclical carbonate functions, such as those described in the aforementioned patent applications.

The diisocyanate monomers used to prepare the polyisocyanates defined above are generally selected from diisocyanates with an aliphatic nature and/or a cyclo-aliphatic nature and/or, more rarely, an aromatic nature.

The preferred polyisocyanates are generally the homocondensation or heterocondensation products of the following aliphatic, cycloaliphatic or arylaliphatic isocyanate monomers:

1,6-hexamethylene diisocyanate,
  1,12-dodecane diisocyanate,
  cyclobutane-1,3-diisocyanate,
  cyclohexane-1,3 and/or 1,4-diisocyanate,
  1-isocyanato-3,3,5-trimethyl-5-diisocyanatomethylcyclohexane (isophorone diisocyanate, IPDI),
  isocyanatomethyloctylene diisocyanates (TTI), in particular 4-isocyanatomethyl-1,8-octylene diisocyanate,
  2,4 and/or 2,6-hexahydrotoluoylene diisocyanate ($H_6TDI$),
  hexahydro-1,3 and/or 1,4-phenylene diisocyanate,
  perhydro-2,4' and/or 4,4'-diphenylmethane diisocyanate ($H_{12}MDI$), and the aromatic amino precursors or perhydrogenated carbamates in general,
  bis-isocyanatomethyl cyclohexanes (1,3 and 1,4 in particular) (BIC),
  bis-isocyanatomethyl norbornanes (NBDI),
  2-methylpentamethylene diisocyanate (MPDI),
  tetramethylxylylene diisocyanates (TMXDI), and
  lysine diisocyanate and lysine di- or triisocyanate (LDI or LTI) esters.

The homocondensation products are products resulting from the condensation of one of the diisocyanate monomers listed above with itself. The heterocondensation products are products resulting from the condensation of two or more of the monomers listed above with one another and/or optionally with one or more mobile hydrogen compounds, such as an alcohol, a diol and other similar compounds.

For example, these may be polyisocyanates sold by Rhodia under the "Tolonate®" brand name, "Tolonate® HDT" in particular, which forms "Tolonate® D2" after being masked by methylethylketoxime (MEKO).

The polyisocyanates contained in the composition of the present invention may also be polyisocyanate derivatives resulting from aromatic isocyanates used alone or mixed with aliphatic compounds.

However, the use of these aromatic derivatives is limited in terms of the amount and is also not a preferred variant, since this generally results in coatings which may undergo discolouration, generally yellowing, as they age, particularly if the coatings are exposed to a high degree of ultraviolet radiation, for example solar ultraviolet radiation.

Examples of non-limiting aromatic isocyanates include:
  2,4- and/or 2,6-tolylene diisocyanate (TDI),
  diphenylmethane-2,4' and/or 4,4'-diisocyanate (MDI),
  1,3- and/or 1,4-phenylene diisocyanate,
  triphenylmethane-4,4',4"-triisocyanate, and
  MDI or TDI oligomers.

Mixtures of these (cyclo)aliphatic and/or aromatic polyisocyanates may also be used.

The viscosity of the non-masked polyisocyanate compounds used in the invention lies in a wide viscosity range determined by the structure of the polyisocyanate compounds which may be used. The viscosity is generally greater than 10 mPa·s at 25° C. with a non-volatile matter content of 100%, preferably greater than 100 mPa·s at 25° C. with a non-volatile matter content of 100%.

The viscosity of Rhodia products is given by way of example, such as Tolonate® HDT LV2, which has a viscosity of approximately 600 mPa·s±150 mPa·s at 25° C. and a dimer pattern content of approximately 5% by weight, or Tolonate® HDT HR which has a viscosity of approximately 20,000 mPa·s at 25° C. with a non-volatile matter content of 100%, or 2,000 mPa·s at 25° C. with a non-volatile matter content of 90% in n-butyl acetate and a dimer pattern content of approximately 3% by weight.

Some of the polyisocyanate compounds are solid at a non-volatile matter content of 100%. For example, this is the case for the IPDI isocyanurate trimer or IPDI dimer. The viscosities of some of these compounds in an organic solution are given by way of example; Tolonate® IDT 70 S (IPDI isocyanurate trimer) thus has a viscosity of approximately 1,700 mPa·s±600 mPa·s at 25° C. for a formulation of 70% non-volatile matter in Solvesso® 100, Tolonate® IDT 70 B (IPDI isocyanurate trimer) has a viscosity of approximately 600 mPa·s+300 mPa·s at 25° C. for a formulation of 70% non-volatile matter in n-butyl acetate.

Homocondensation and/or heterocondensation products originating from an aliphatic, in particular non-cyclic, diisocyanate monomer, preferably HDI, are preferred due to the ability thereof to impart greater resistance to chipping to coatings.

In addition, when the number of links between dimer patterns and isocyanurate patterns increases and/or the average functionality of isocyanate functions in the polyisocyanate composition increases, the chemical resistance and hardness of the coating are improved.

The polyisocyanates present in the composition according to the invention may be masked completely or in part, that is to say the isocyanate functions are not free but are masked by a masking agent or a mixture of masking agents, such as those defined below. It is preferable in particular to use compositions containing polyisocyanates which are masked completely or in part, more preferably completely masked, specifically for the preparation of a monocomponent (1K) coating formulation.

"Masked polyisocyanate" is to be understood in the present description as a polyisocyanate for which at least 50%, preferably 80%, advantageously 90%, and more preferably all of the isocyanate functions, are masked.

The masking agent or the mixture of masking agents which temporarily or permanently protects the isocyanate functions are compounds which have at least one function bearing a labile hydrogen, generally a function bearing a labile hydrogen, preferably a single function bearing a labile hydrogen and are reactive in relation to the isocyanate function. This function which bears a labile hydrogen may have a pKa value corresponding either to the ionisation of an acid [including the hydrogen of -ol functions ("-ol(s)" is to be understood in the present description as phenols and alcohols)], or to the associated acid of a base (generally nitrogenated).

Mores specifically, in order to optimise the results of the present invention, said pKa (or one of them if a plurality thereof can be determined) of the function bearing one or more labile hydrogens is at least 4, advantageously 5, preferably 6 and at most 14, advantageously 13, preferably 12 and more preferably 10. An exception thereto must be made for lactames, the pKa of which is greater than these values and which represent potential masking agents, although they are not preferred for the invention.

A masking agent is known as a temporary masking agent when the isocyanate function is protected temporarily by the masking agent and does not react under storage conditions for the formulated system with hydroxyl functions of the mobile hydrogen compound, in particular with polyol, but is subsequently released during the thermal cross-linking reaction.

The released isocyanate function therefore reacts with the mobile hydrogen functions or the polyol reagent in order to produce a urethane bond and to form a polyurethane network which forms a portion of the coating. The temporary masking agent is either eliminated as a volatile organic compound along with most of the solvents in the formulation, or remains in the film, or reacts with the aminoplastic resin when the formulation contains said aminoplastic resin.

Non-limiting examples of temporary masking agents according to the invention include hydroxylamine derivatives such as hydroxysuccinimide and oximes such as methylethylketoxime, hydrazine derivatives such as pyrazoles, triazole derivatives, imidazole derivatives, phenol derivatives or the like, amide derivatives such as imides, and lactames such as caprolactame, hindered amines such as diisopropylamine and N-isopropyl-N-benzylamine, and also malonates or ketoesters and hydroxamates.

The compounds may optionally contain substituents, of the alkyl chains in particular.

In order to determine the pKa values defined above, reference may be made to "The determination of ionization constants, a laboratory manual", A. Albert, E. P. Serjeant; Chapman and Hall Ltd, London".

In order to obtain a list of masking agents, reference may be made to Z. Wicks (Prog. Org. Chem. (1975), 3, 73 and Prog. Org. Chem., 1989, 9,7) and Petersen (Justus Liebigs, Annalen der Chemie 562, 205, (1949)).

The masking agent(s) which may be used in the reaction for protecting the isocyanate functions may be water-soluble, water-soluble in part or insoluble in water.

Preferred temporary masking agents are methylethylketoxime, also known as MEKO, 3,5-dimethylpyrazole, also known as DMP, 2- or 4-alkylimidazoles, dialkyl malonates, cyclic β-ketoesters, hindered amines, caprolactame and triazoles, which are optionally substituted.

The present invention is not limited to temporary masking agents alone, but may also use masking agents known as permanent masking agents. These permanent masking agents are characterised by the fact that the isocyanate functions are protected by the masking agent and do not react with the hydroxyl functions of the mobile hydrogen compound, polyol in particular, under storage conditions of the formulated system or during the thermal cross-linking reaction.

The isocyanate functions are therefore not restored during the cross-linking reaction by means of curing in a furnace and remain masked, said masked functions thus being capable of reacting under cross-linking conditions with the methylol functions (—N—CH$_2$—OH) or alkoxyalkyl functions (—N—CH$_2$—O-alkyl) of aminoplastic resins, such as those defined above, in the presence of an acidic catalyst, preferably a sulphonic catalyst, or a latent precursor of this catalyst which may be a tertiary amine salt of a sulphonic acid. The compounds thus obtained form part of the coating.

The masking agent(s) used to permanently protect the isocyanate functions is (are) generally hydroxyl or sulphhydryl function compounds which are preferably monofunctional, such as hydroxyl (cyclo)alkanes, for example methanol, butanols, cyclohexanol, 2-ethylhexanol or carboxylic acid function compounds, such as propanoic acid, pivalic acid, benzoic acid, and the like. These compounds may optionally bear one or more substituents.

The "permanent" masking agents may also be isocyanate functions masked by compounds comprising at least one cross-linkable function which is capable of polymerising by means of UV radiation. Examples of "permanent" masking agents include hydroxyalkyl acrylates or hydroxyalkyl methacrylates.

In some cases, it is also possible to use bifunctional or polyfunctional masking agents in a generally limited amount which comprise functions which are capable of producing temporarily and/or permanently masked isocyanate functions. This is not preferred, however, since the masked polyisocyanate compounds rapidly exhibit elevated viscosity and this effect is all the more marked the further the functionality of isocyanate functions (NCO) increases.

The reactive (or mobile) hydrogen compounds which react with the polyisocyanate(s) during thermal treatment preferably have at least two mobile hydrogen atoms, up to approximately 20 mobile hydrogen atoms per molecule. These mobile hydrogen compounds are generally polymers containing two or more hydroxyl functions (alcohol or phenol) and/or thiol functions and/or primary or secondary amine functions and/or containing precursor functions such as epoxy or carbonate functions which release hydroxyl functions by reacting with a suitable nucleophile (an amine or water for example).

The compounds are preferably selected from the polyols which may be used, either alone or in a mixture.

The polyols used in the formulations of the invention are advantageously selected from acrylic or polyester or polyurethane or polyether polymers.

It is preferable to use polyester polyols or polyester urethanes, in particular for the "primer" coat, for the purpose of enhancing the resilience of the coatings. In general, a mixture of the two polyester resins or urethane polyesters is used, one being characterised by a "hard" nature and the other by a "soft" or "flexible" nature. The hard or flexible nature of the polyesters is provided thereto by the nature of the monomers used during the synthesis thereof.

A "hard" polyester will be obtained by selecting aromatic and/or cycloaliphatic and/or highly branched acid or alcohol monomers. Examples of monomers of this type include phthalic anhydride, cyclohexanediol or 2,2,4-trimethylpentanediol.

A "flexible" polyester is obtained by selecting slightly branched linear aliphatic monomers, such as adipic acid or 1,4-butanediol or 1,6-hexanediol, or those which comprise heteroatoms in the structure thereof, such as diethylene or polyethylene glycols. The latter are not desirable, however, since these compounds have a drawback in terms of their stability to ultraviolet radiation.

The polyester polyols are industrial products and the synthesis thereof is for the most part described and known to the person skilled in the art. The synthesis will therefore not be described in this document. For more details, please refer to the following publications: "Matériaux polymères, structures, propriétés et applications" by Gottfried W. Ehrenstein and Fabienne Montagne published in 2000 by Hermès Science; "Handbook of Polyurethanes" by Michael Szycher, published in 1999 by CRC Press; "Resins for coatings, Chemistry, Properties and Applications" by D. Stoye and W. Freitag, published by Hanser in 1996, and the collected lectures from Eurocoat 1997 (page 505 to 515) on page 507. It is also possible to refer to the commercial catalogues of polyol distributors, in particular the book entitled "Specialty Resins, creating the solution together" from Akzo Nobel Resins published in February 2001.

The average functionality of hydroxyl functions in the polyol polymers is at least 2, generally between 3 and 20. In general, if the functionality is too high, this leads to compounds which are too "hard" for the intended application and it is preferable to use polyester polyols with a relatively low functionality of less than 15, preferably less than 10 or less than 8.

The definition of the average functionality of hydroxyl functions per polymer chain is given, for example, in "High solids hydroxy acrylics and tightly controlled molecular weight" by Ben Van Leeuwen in the Eurocoat 97 article mentioned above.

This average functionality F(OH) is calculated by using the following equation:

$$F(OH) = \frac{OH\ Number * Mn}{56100}$$

in which:

F(OH) represents the average functionality of hydroxyl functions;

OH number represents the hydroxyl function titre expressed in mg of KOH (potassium hydroxide) per gram of the polymer;

Mn represents the average molecular mass, as a number, of the polymer, determined by gel permeation chromatography (GPC) by comparison with polystyrene calibration standards.

The average molecular mass, as a number, of the polyester polyols used in the composition of the invention is generally between 500 and 10,000, preferably between 600 and 4,000.

In some cases it is also possible to use a polyacrylic polyol or a mixture of polyacrylic polyols which provide the coating with a greater degree of hardness. These polyols may be "hard" or "flexible" depending on whether monomers with an aromatic and/or cycloaliphatic and/or highly branched nature for the "hard" property and monomers having mostly an aliphatic nature for the "flexible" property are used respectively.

The synthesis of acrylic polyols is also known to the person skilled in the art and the aforementioned books may be consulted for more details on the synthesis of said acrylic polyols.

The average molecular mass, as a number, for the acrylic polyols is generally between 300 and 50,000, preferably between 500 and 25,000, advantageously between 1,000 and 15,000.

The hydroxyl function titre is generally between 10 and 750 mg of KOH per gram of the polymer, preferably between 15 and 500 mg of KOH per gram of the polymer.

For examples of acrylic polyols, please refer to the aforementioned Eurocoat 97 article, page 515, where the characteristics of some acrylic polyols are listed, but the scope of the invention is not limited to these examples.

It is also possible to use hyperbranched polyols which are generally characterised by a higher functionality than linear polyols, but these products are not preferred due to the high viscosity thereof.

Structured polyols or block polyols may also be used if compartmentalisation of properties is desired. However, these products are generally more expensive and are only used to provide one particular property. These compounds are, for example, a rheological agent or an agent which facilitates the dispersion of pigments.

As a general rule, for the purposes of the present invention, the isocyanate function/mobile hydrogen function ratio is between 1.5 and 0.5, preferably between 1.2 and 0.8. In particular, when the mobile hydrogen compound is a polyol, the isocyanate function/hydroxyl function ratio is between 1.5 and 0.5, preferably between 1.2 and 0.8.

The composition according to the present invention also comprises an amino-type or aminoplastic-type resin of the melamine formaldehyde and/or urea formaldehyde and/or benzoguanamine formaldehyde type. These resins are known and information relating to the synthesis thereof is given in the aforementioned documents, in particular in the book by Stoye and Freitag on page 102, chapter 6.2.

These aminoplastic resins react at a temperature of between 100° C. and 180° C. in particular with the urethane functions of the polyurethane network created beforehand or formed during the cross-linking reaction in a furnace as a result of the reaction of the isocyanate functions, which are optionally released, with the hydroxyl functions of the polyol, or with the true carbamate functions (R—O—C(=O)—NH$_2$) which are optionally carried by the polyols and/or the polyisocyanates.

The cross-linking reaction of these aminoplastic resins with the urethane or true carbamate (R—O—C(=O)—NH$_2$) functions is a known reaction which is generally catalysed by a strong acid such as para-toluene sulphonic acid or naphthalene sulphonic acid, or a latent form of these acidic catalysts, i.e. the tertiary amine salts of these strong acids. Please refer to the aforementioned books for more information on these aminoplastic resins and the synthesis thereof.

The presence of one or more aminoplastic resins in the coating composition according to the present invention is particularly advantageous for the formation of the base coat, and is generally not necessary for the formation of the top coat, although this is not excluded from the scope of the invention.

The compositions according to the present invention also serve as a basis for formulations used for can coating and coil coating.

As mentioned above, the compositions according to the invention provide remarkable properties in terms of hardness and resistance to chipping to the substrates to which they are applied, in particular when they are applied as a hardener for a primer coat on a metal substrate, for example aluminium and in particular stainless steel, or on a plastics material substrate.

Another advantage of the coating compositions according to the invention is the fact that the substrates have the remarkable properties given above without resulting in deterioration of other properties.

The coatings thus obtained retain, in particular, a resistance to chemical and/or biological attack and are resistant in particular to animal droppings, in particular bird droppings, in a desirable manner.

In order to obtain these improved properties for the coating, the following conditions are preferably satisfied:

- a weight ratio of the temporarily and/or permanently masked polyisocyanate(s) in relation to the total weight of the resins (mobile hydrogen compound, aminoplastic resin and masked polyisocyanate(s)) of between 5 and 80% by weight, preferably between 10 and 60% by weight and advantageously between 15% and 40%;
- an amount by weight of dimer patterns in the precursor polyisocyanate(s) (before the isocyanate function is masked) of the polyisocyanate(s) containing temporarily and/or permanently masked isocyanate functions of between 0.25 and 25%, preferably between 0.5% and 20%;
- a molar ratio [(masked and free isocyanate functions)/imino-trimer patterns] is less than 100, preferably less than 90; and/or
- a molar ratio (imino-trimer patterns/trimer patterns) is greater than 3; and
- the average functionality of isocyanate functions of the precursor polyisocyanate(s) (before the isocyanate functions are masked) is generally at least 2 and at most 10, preferably greater than 2.5 and at most 8, advantageously between 2.8 and 6.5.

The desired properties may further be improved if a surfactant additive is added to the polyisocyanate formulation containing masked isocyanate functions.

The invention further relates to the process for preparing a multi-coat coating as defined above comprising at least one polyisocyanate composition detailed above which has improved properties in terms of hardness and resistance to chipping.

The process comprises the steps of mixing the various components of the coating in accordance with conventional methods known in this field, and said mixing procedure may be achieved by using conventional mixers such as mixers or grinder mixtures depending on the viscosity of the different components and the type of coating desired. It should be understood, however, that mixing may be carried out just before the coating is applied, or the composition may be in the form of a ready-to-use formulation (monocomponent formulation, or a 1K formulation), or the composition may be in the form of premixes which will be mixed together just before use.

It may be advantageous for example to produce separate premixes of only two or three of the components of the coating formulation then to mix the two or three premixes (2K or 3K formulations) just before use.

In the case of the present invention, 1K formulations are preferred, that is to say formulations which are ready to use and contain all of the aforementioned components of the coating formulation. In this case, the polyisocyanates are advantageously polyisocyanates having isocyanate functions which are masked at least in part, or are completely masked.

It should be noted, however, that when a surfactant or a mixture of surfactants is present in the polyisocyanate composition, said surfactant or mixture is preferably added to the polyisocyanate composition before, during or after the reaction in which the isocyanate function is masked by masking agent.

However, the surfactant or the mixture of surfactants may also be incorporated directly into the coating composition or may be added with one of the other components of the coating composition, that is to say with the polyol, the aminoplastic resin, the pigment(s) if the coating is a paint, the additives or any other component of the final polyurethane composition.

The present invention also relates to the substrates coated by the composition defined above. The substrate may be of any type and is generally a metal substrate, for example aluminium or steel, in particular stainless steel. The substrate may also be a plastics material substrate, that is to say a thermoplastic or thermosetting polymer material optionally comprising fillers, for example reinforcing fillers, such as glass fibres, carbon fibres and other fibres for example.

As a result of the properties conferred to the substrate by the aforementioned coating, the coated substrate may optionally be bent, shaped, or stamped. The substrate thus coated has a very high degree of resistance to chipping and a very high degree of resistance to pressure washing, even high-pressure washing, in particular in the case of plastics materials substrates.

The examples illustrating the invention are given in the experimental part below and do not limit this invention.

EXPERIMENTAL PART

The main starting materials are commercial industrial compounds, with the exception of the masked polyisocyanate compositions comprising surfactant additives which are prepared separately.

The starting materials used to synthesise the compositions of the invention, known as polyisocyanate hardener formulations, are:

Methylethylketoxime (MEKO);

Tolonate® HDT HR 90 B, HDI-based polyisocyanate composition with a non-volatile matter content of 90% in n-butyl acetate, sold by Rhodia, NCO titre: 0.413 moles of NCO functions per 100 grams, viscosity: approximately 2,000 mPa·s at 25° C. and with a non-volatile matter content of 90%; true dimers: approximately 2% by weight;

Tolonate® HDT LV2, HDI-based polyisocyanate compound with a non-volatile matter content of 100%, sold by Rhodia, NCO titre: 0.547 moles of NCO functions per 100 grams, viscosity: approximately 600 mPa·s at 25° C.; true dimers: approximately 15% by weight;

Tolonate® D2, commercial product which is provided by Rhodia and is an HDI-based polyisocyanate formulation (Tolenate® HDT) masked by MEKO, with a non-volatile matter content of 75% in Solvesso® 100. The potential NCO titre is 11.2%. The viscosity is approximately 3.250 mPa·s at 25° C. The amount by weight of true dimers contained in TOLONATE® D2 is 0.7%.

Analysis of the Imino-Trimer Patterns Present in the Polyisocyanate Hardeners

Carbon-13 nuclear magnetic resonance spectroscopy ($^{13}C$ NMR, AMX 300 spectrometer equipped with a $^{13}C$ 10 mm QMP probe) was used in a deutrated chloroform medium and in the presence of iron acetylacetonate (FeAcAc) to quantify the specific patterns of the polyisocyanate compositions.

The measurement parameters are summarised in the table below:

| Parameters | Quantitative analysis |
| --- | --- |
| Program | "CARQUANT.QNP" |
| Sequence | zgig30 |
| Proton decoupling | WALTZ 16 |
| Pulse angle | 30° |

-continued

| Parameters | Quantitative analysis |
|---|---|
| Acquisition time | 2 sec |
| Time between pulses | 2 sec |
| Number of accumulations | 8K |
| Spectral width | 20000 Hz |
| Exponential function before FT (LB) | 0.5 to 2 |
| Analysis time | 9 h |

The attribution of signals was carried out principally on the basis of the carbonyl functions.

Table 1 below shows the distribution of dimer, trimer and imino-trimer patterns contained in the polyisocyanates, before masking, in Examples 1 and 2 (determined by $^{13}C$ NMR) and also the calculation of the different ratios of the different patterns.

TABLE 1

Pattern distribution and ratios

| Characteristic patterns (determined by $^{13}C$ NMR) | Number of functions | | |
|---|---|---|---|
| | Tolonate ®HDT HR 90 B | Tolonate ®HDT LV2 | Tolonate ®HDT |
| Trimer cycle | 100 | 100 | 100 |
| Dimer cycle | 4.6 | 24.7 | 8.7 |
| Imino-trimer cycle | 3.5 | 4.0 | 2.8 |
| NCO function | 224 | 351 | 287 |
| Pattern ratio | | | |
| NCO/dimer patterns | 48% | 14% | 33 |
| NCO/trimer patterns | 2.24% | 3.51% | 2.87 |
| NCO/imino-trimer patterns | 64% | 88% | 102.5 |
| Imino-trimer/trimer | 3.5% | 4% | 2.8 |

Masking the isocyanate functions with masking agents does not affect the imino-trimer pattern/trimer pattern ratio at all. After masking, the free NCO+masked NCO function/imino-trimer pattern ratio is identical to the NCO/imino-trimer pattern ratio.

Synthesis of the Polyisocyanate Hardeners

The synthesis of the masked polyisocyanate hardener formulations is described in the following examples.

Example 1

Synthesis of Masked Polyisocyanate Hardener Formulation (Hardener 1 with Tolonate® HDT HR 90 B)

3,045 g of Tolonate® HDT HR. 90 B, 974.2 g of Solvesso® 100 and 1,095.6 g of MEKO were added successively, whilst being stirred, into a double-clad three-neck reactor equipped with a mechanical stirrer, a cooler and adding vials. The reaction was exothermic and the temperature increased gradually to 95° C. The reaction medium was then maintained at 80° C. for two hours whilst being stirred.

The viscosity of the product masked in this way was 6,650 mPa·s at 25° C. The potential NCO titre was 10.33% (the potential titre expresses the number of moles of NCO functions which may be restored by being heated to approximately 150° C.). The average functionality of isocyanate functions in the Tolonate® HDT HR 90 B precursor polyisocyanate is approximately 4.5, which results in an average functionality of masked isocyanate functions of approximately 4.5, the masking operation not causing any changes to the average functionality.

The number of bonds between dimer patterns (uretidinediones) and isocyanurates was high and was characterised by a high "dimer pattern carbonyl band"/"trimer pattern carbonyl band" ratio in the heavy polyisocyanates (greater than trimers), measured by infrared technology linked with gel permeation chromatography of polymers (see patent applications FR 2 822 828 and FR 2 837 820). This ratio was approximately 3.5. The amount of dimer patterns contained in the heavy polyisocyanates represents approximately 40% of the total amount of dimer patterns in the starting polyisocyanate before masking.

Example 2

Synthesis of Masked Polyisocyanate Hardener Formulation (Hardener 2 with Tolonate® HDT LV2)

The same method was used as for Example 1, with the exception that the commercial product Tolonate® HDT LV2 was used as the starting polyisocyanate.

2,616 g of Tolonate® HDT LV2, 1,289.2 g of Solvesso® 100 and 1,251.8 g of MEKO were added successively, whilst being stirred, into a double-clad three-neck reactor equipped with a mechanical stirrer, a cooler and adding vials. The reaction was exothermic and the temperature increased gradually to 90° C. The reaction medium was kept at 80° C. for two hours whilst being stirred. The viscosity of the product masked in this way was 1,970 mPa·s at 25° C. The potential NCO titre was 11.72% (the potential titre expresses the number of moles of NCO functions which may be restored by being heated to approximately 150° C.).

Examples 3 & 4

OME Application Tests

Formulation Description

Polyol:

Vialkyd® 927/70X, supplied by UCB Surface Specialties; and

Vialkyd® VAN 6138/80X, supplied by UCB Surface Specialties.

Amino Resin:

Maprenal® MF980/62B, supplied by UCB Surface Specialties.

The formulations were prepared as indicated in Table 2 below. The characteristics of the formulations are shown in Table 3 below.

TABLE 2

OME anti-chip primer sealer formulations

| Components of the basic formulation | Amount (g) | Function | Supplier |
|---|---|---|---|
| Part 1 | | | |
| Vialkyd ® AN 927/70X | 22.45 | Hard polyester resin | UCB Surface Specialties |
| Kronos ® 2310 | 13.55 | Pigment ($TiO_2$) | Kronos |
| Blanc Fixe micro | 18.50 | Filler | Sachtleben Chemie |
| Special Black SP 4 | 0.05 | Black pigment | Degussa |
| Aerosil ® R 972 | 0.30 | Rheological additive (calcined silica) | Degussa |
| Ircogel ® 905 | 0.20 | (calcium-based) rheological additive | The Lubrizol Corp. |
| Butyl diglycol | 2.10 | Solvent | |
| BYK-358 N ® | 0.60 | Levelling agent | BYK Chemie |
| Additol VXL 6212 ® | 0.20 | Wetting and dispersing agent | UCB Surface Specialties |
| Methoxypropyl acetate | 0.20 | Solvent | |
| Grind in a ball mill until fineness level 9 is reached on the NORTH gauge, then add part 2: | | | |
| Part 2 | | | |
| Solvesso ® 100 | 10.50 g | Solvent (cup of alkylbenzene) | ExxonMobil Chemical |
| Exxal ® 13 | 2.50 g | Anti-pinhole agent (isotridecanol) | ExxonMobil Chemical |
| Vialkyd ® AN 903/70 E PAC | 9.60 g | Flexible polyester resin | UCB Surface Specialties |
| Maprenal ® MF 980/62 B | 5.55 g | Benzoguanamine | UCB Surface Specialties |
| Masked polyisocyanate hardener formulation of the invention to be tested | 13.50 g | Blocked polyisocyanate | Rhodia PPMC |
| Additol ® XL 480 | 0.20 g | Levelling agent | UCB Surface Specialties |
| | 100.00 g | | |

TABLE 3

Characteristics of the formulations in Table 2

| | |
|---|---|
| Non-volatile matter content | Approximately 68% |
| Weight ratio of the resins used | Polyesters/benzoguanamine/blocked polyisocyanate = 62.3/9.6/28.1 |
| Pigment/binder ratio | 90/100 = 0.90 |
| Application viscosity | 28 seconds, CAF 4*, 23° C. |
| Dilution | 70 seconds, CAF 4*, with Solvesso ® 100<br>28 seconds, CAF 4*, with xylene/butyl acetate (40/60) |

*CAF 4: Ford cup no. 4

Production of the OME Anti-Chip Primer (Primer Sealer) to be Tested

All of the components of part 1, which were ground in a ball mill until they reached fineness level 9 on the North gauge, were introduced into a reactor. Production was completed by adding the part 2 components and mixing all of the components together. The formulation was subsequently applied to the substrate.

Production of the Coating

The coating was produced under standard conditions for the preparation of a vehicle original manufacturing equipment (OME) coating and the formulations were applied using an airgun. The conditions for application are described below.

Standard pre-treated "Offredy" plates coated by electrophoresis treatment PP1 with the plate reference EC 090190 DB 1 PP1 were used as the substrates for the coating.

The primer formulation to be tested was applied to said plate by using an airgun. After application, rapid (flash) evaporation was carried out for 10 minutes at room temperature and the plate was subsequently placed in a furnace to cure at a temperature of 150° C. for 30 minutes. The thickness of the primer was between 30 and 35 microns.

After curing and cooling, an airgun was used to apply a commercially-available aluminium grey PSA solvent base (PE/MEL/CAB), reference PPG. The application thickness was approximately 15 µm. Flash evaporation was then carried out at room temperature for 10 minutes and a standard vehicle varnish, with the reference Varnish (ACRY/MEL/Crosslinker) HTR 3000 PPG for PSA, was applied "wet-on-wet". The application thickness was approximately 40 µm.

After flash evaporation for 10 minutes at room temperature, curing was carried out in a furnace at 140° C. for 30 minutes.

The coating was the left for a day at room temperature and then the properties of the coating were measured.

Physicochemical Characterisation

The physicochemical measurements which characterise the properties of the coatings obtained with the different systems are as follows:

Persoz hardness: pendulum hardness measurements were carried out on the polymerised film to be tested.

Xylene softening: the measurements were carried out on the polymerised film to be tested.

Resistance to chipping: in accordance with the PSA method no. D24 1312.

Shock-resistance measurements: in accordance with Erichsen-drawing test and with the ASTM ISO 6212 standard.

The thickness of the films on the substrate were checked systematically. Example 3 corresponds to the formulation using the polyisocyanate hardener from Example 1, Example 4 corresponds to the formulation using the polyisocyanate hardener from Example 2.

Results:

The results of the different tests are summarised in Table 4 below.

TABLE 4

Formulation test results

| Formulation | Primer thickness in μm | Persoz hardness (s) | Xylene softening* | Erichsen drawing test (mm) | Original equipment chipping D24 1312 Target score: ≦2 | Retouch chipping D24 1312 Target score: ≦3 |
|---|---|---|---|---|---|---|
| Example 3 | 35 | 279 | 0 | 6.9 | 2 | 1 |
| Example 4 | 35 | 226 | 0 | 6.5 | 1-2 | 2 |

*0: no softening, 1: softening, 2: destruction of the film

Conclusions on the Results Obtained for OME:

1. It was found that the Persoz hardness of the coatings was high and increased with the average functionality of isocyanate functions of the precursor polyisocyanate mixture of the masked polyisocyanate formulation and with the increase in the "isocyanurate-dimer-isocyanurate" links. The formulation using Tolonate® HDT HR 90 B was thus found to have a difference of an additional 53 seconds in relation to the formulation using Tolonate® HDT LV2.

2. The coatings of the invention (formulations in Examples 3 and 4) were both found to have increased resistance to chipping of less than the target score, a value of less than the target value being the indicator for increased resistance, therefore for improved performance.

3. The coating obtained from a polyisocyanate with a higher functionality containing "isocyanurate-dimer-isocyanurate" links had a better Persoz hardness and a better resistance to chipping during retouching operations.

Example 5 And Comparative Example

Coating Application for can Coating

Formulation Description

| Components of the formulation | Amount (g) | Function | Supplier |
|---|---|---|---|
| Polymac ® 320-1308 | 103.5 | Polyol | Eastman Chemical |
| Aerosil ® 200 | 0.5 | Rheological agent | Degussa |
| Modaflow ® 2100 | 0.9 | Levelling agent | DOW |
| Titanium oxide | 78.8 | Pigment | Kronos |
| Polyisocyanate hardener to be tested | 10.8 | Masked polyisocyanate | RHODIA |
| Rhodiasolv ® RPDE | 11.3 | Solvent | RHODIA |
| Solvesso ® 150 | 40.3 | Solvent | ExxonMobil Chemical |

The NCO/OH ratio was 0.8 and remained constant during the tests with Tolonate® HDT HR 90 B blocked by MEKO (Example 1). The results for the can coating obtained are complied in Tables 5 and 6 below.

Example 5 corresponds to the formulation intended by the invention using the polyisocyanate hardener from Example 1. The comparative example corresponds to the formulation which uses a composition utilising Tolonate® D2, which results from Tolonate® HDT being masked by MEKO, as the polyisocyanate hardener (see Table 1, right-hand column).

TABLE 5

Measurements 3 hours after curing

| | | Masked polyisocyanate hardener | | Comparative Example 5 | |
|---|---|---|---|---|---|
| Curing conditions | Thickness of paint (μm) | Comparative Persoz hardness (sec.)* | Example 5 | Double rub with methylethylketone** | |
| 12 min at 150° C. | 25 | 70 | 80 | 4 | 13 |
| 12 min at 170° C. | 25 | 80 | 90 | 22 | 75 |
| 12 min at 180° C. | 24 | 85 | 95 | 45 | 77 |
| 12 min at 190° C. | 24 | 90 | 90 | 55 | 84 |

*The higher the value the greater the hardness is increased.

**The double rub with methylethylketone characterises the chemical resistance of the coating: the greater the value the better the resistance.

TABLE 6

Measurements 1 day after curing

| Curing conditions | Masked polyisocyanate hardener | | | Comparative Example 5 | |
|---|---|---|---|---|---|
| | Thickness of paint (μm) | Comparative Persoz hardness (sec.)* | Example 5 | Double rub with methylethylketone** | |
| 12 min at 150° C. | 25 | 80 | 80 | 5 | 14 |
| 12 min at 170° C. | 25 | 90 | 90 | 47 | 75 |
| 12 min at 180° C. | 24 | 100 | 100 | 57 | 97 |
| 12 min at 190° C. | 24 | 120 | 125 | 72 | 125 |

*The higher the value the greater the hardness is increased.
**The double rub with methylethylketone characterises the chemical resistance of the coating: the greater the value the better the resistance.

Conclusions for Example 5

It was found that the coating obtained from the formulation using the masked polyisocyanate resulting from Tolonate® HDT HR 90 B with an average functionality of masked isocyanate functions of approximately 4.5 exhibits a Persoz hardness and chemical resistance which are far greater than those of the coating obtained from the Tolonate® D2 hardener with an average functionality of masked isocyanate functions of approximately 3.6, in identical curing conditions in the furnace.

The formulations of the invention thus enable gains in terms of productivity or temperature to be achieved.

The invention claimed is:

1. A coating composition cross-linkable into a hard/resilient and shock-resistant coating, comprising:

a) at least one polyisocyanate which comprises at least one dimer structural unit (pattern) and at least one other polyisocyanate which is the same as or different from the above at least one polyisocyanate and which comprises at least one iminotriazinedione (imino-trimer) structural unit (pattern) of formula

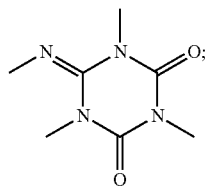

b) at least one compound having at least one mobile hydrogen function selected from the group consisting of primary or secondary hydroxyl functions, phenol functions, primary and/or secondary amine functions, carboxylic functions and an SH function, and c) at least one aminoplastic resin which comprises at least one melamine-aldehyde resin and/or urea-aldehyde resin and/or benzoguanamine resin and/or alkoxyalkyl derivative thereof, wherein one and/or the other of said polyisocyanates have at least one of the following two characteristics:

the molar ratio (isocyanate functions/imino-trimer patterns) is less than 100, prior to masking thereof, and/or the molar ratio (imino-trimer patterns/trimer patterns) is greater than 3.

2. The coating composition as defined by claim 1, further comprising:

d) at least one catalyst for reacting compound a) with compound c), and/or at least one strong acid compound or latent form thereof, as a catalyst for reacting the melamine and/or urea compounds or derivatives thereof with urethane or true carbamate functions.

3. The coating composition as defined by claim 1, comprising:

at least one polyisocyanate containing from 0.25% to 25% by weight of dimer patterns relative to the total weight of the polyisocyanate(s), said dimer patterns being bonded to one or more isocyanurates by hydrocarbon chains;

at least one polyisocyanate which is the same as or different from the above polyisocyanate and which contains at least one imino-trimer pattern;

optionally, at least one polyisocyanate which is the same as or different from the above polyisocyanate and which contains a true dimer;

at least one compound having at least one mobile hydrogen function, and/or primary and/or secondary amine functions, and/or SH functions;

at least one organic solvent;

at least one aminoplastic resin which comprises at least one melamine/formaldehyde resin and/or urea/formaldehyde resin or benzoguanamine resin and/or alkoxyalkyl derivative thereof; and optionally, at least one catalyst for the polyurethane reaction and/or at least one strong acid catalyst for the reaction between the melamine and/or urea compounds or the derivatives thereof and the urethane functions or true carbamate functions.

4. The coating composition as defined by claim 1, wherein the dimer patterns are bonded to one or more isocyanurate patterns in the form of links represented by the following formulae (I) to (V) and mixtures thereof:

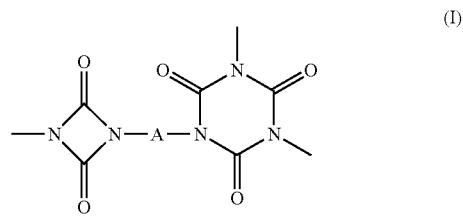

-continued

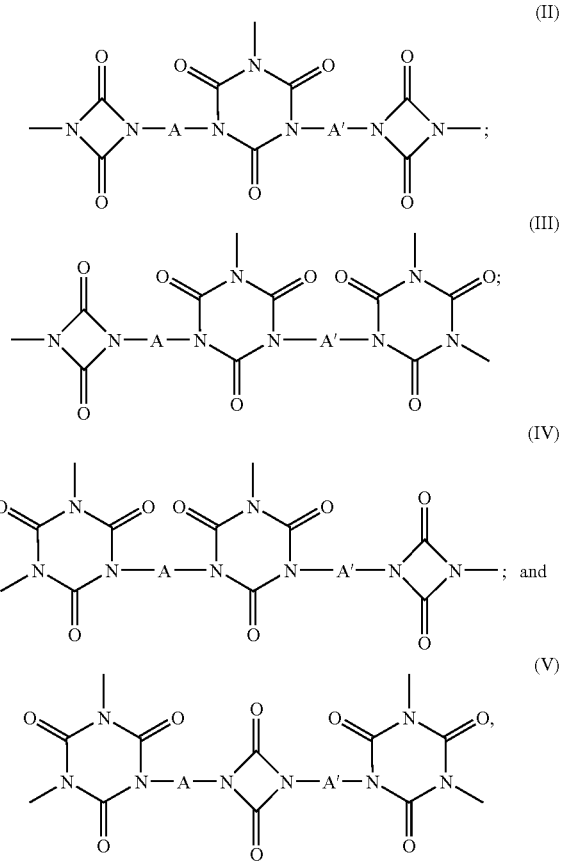

in which A and A' are the same or different and are each a linear, branched or cyclic divalent radical containing from 1 to 20 carbon atoms.

5. The coating composition as defined by claim 1, comprising:
- from 5% to 20% by weight of at least one polyisocyanate relative to the total weight of the composition without solvent (% of dry weight);
- from 15% to 25% by weight of at least one aminoplastic resin relative to the total weight of the composition without solvent (% of dry weight);
- from 55% to 80% by weight of at least one compound having at least one mobile hydrogen function selected from the group consisting of primary or secondary hydroxyl functions, phenol functions, primary and/or secondary amine functions, carboxylic functions and an SH function, relative to the total weight of the composition without solvent (% of dry weight); and
- from 35% to 55%, of at least one organic solvent relative to the total weight of the composition.

6. The coating composition as defined by claim 1, wherein the polyisocyanate(s) is (are) selected from the group consisting of the homocondensation or heterocondensation products of alkylene diisocyanate.

7. The coating composition as defined by claim 1, wherein the polyisocyanate(s) is (are) masked temporarily and/or permanently.

8. The coating composition as defined by claim 7, wherein the masking agent or mixture of masking agents is selected from the group consisting of hydroxylamine derivatives, oximes, hydrazine derivatives, triazole derivatives, imidazole derivatives, phenol derivatives, amide, imide and lactam derivatives, hindered amines, malonates or ketoesters and hydroxamates and mixtures thereof as the temporary masking agents and from the hydroxyl or sulphhydryl function compounds, cyclohexanol and carboxylic acid function compounds and mixtures thereof as permanent masking agents.

9. The coating composition as defined by claim 1, wherein the reactive (or mobile) hydrogen compound which reacts with the polyisocyanate(s) during thermal treatment comprises a polymer containing two or more hydroxyl (alcohol or phenol) functions and/or thiol functions and/or primary or secondary amine functions and/or containing precursor epoxy or carbonate functions which release the hydroxyl functions by reaction with a nucleophile.

10. The coating composition as defined by claim 9, wherein the reactive (or mobile) hydrogen compound comprises a polyol selected from the group consisting of acrylic, polyester or polyurethane polymers.

11. The coating composition as defined by claim 1, wherein the aminoplastic resin comprises a melamine formaldehyde and/or urea formaldehyde and/or benzoguanamine formaldehyde resin.

12. The coating composition as defined by claim 7, satisfying any one of the following conditions:
- a weight ratio of the temporarily and/or permanently masked polyisocyanate(s) relative to the total weight of the resins [mobile hydrogen compound(s), aminoplastic resin(s) and masked polyisocyanate(s)] ranges from 5 to 80% by weight;
- an amount by weight of dimer patterns in the precursor polyisocyanate(s) ranges from 0.25 to 25%;
- a molar ratio [(masked and free isocyanate functions)/imino-trimer patterns] of less than 100; and/or a molar ratio (imino-trimer patterns/trimer patterns) of greater than 3; and
- the average functionality of the isocyanate functions of the precursor polyisocyanate(s) (before the isocyanate functions are masked) ranges from at least 2 to at most 10.

13. The coating composition as defined by claim 4, wherein A and A' are each a linear, branched or cyclic divalent radical containing from 2 to 12 carbon atoms.

14. A paint or varnish comprising the coating composition as defined by claim 1.

* * * * *